United States Patent [19]

Ingram et al.

[11] Patent Number: 4,633,449

[45] Date of Patent: Dec. 30, 1986

[54] METHOD AND APPARATUS FOR INDIRECT DETERMINATION OF SHEAR VELOCITY FROM GUIDED MODES

[76] Inventors: John D. Ingram, #1 W. 11th Pl.; Olive Y. Liu, 1818 Haver St., both of Houston, Tex. 77006

[21] Appl. No.: 434,644

[22] Filed: Oct. 15, 1982

[51] Int. Cl.$^4$ .............................................. G01V 1/40
[52] U.S. Cl. ...................................... 367/75; 367/25; 364/422; 181/102
[58] Field of Search ................. 364/421, 422; 367/25, 367/32, 49, 59, 73, 75; 181/102; 73/151, 152, 153; 175/40, 48, 50

[56] References Cited

U.S. PATENT DOCUMENTS 4,562,557 12/1985 Parks et al. ............................ 367/75

Primary Examiner—Salvatore Cangialosi
Assistant Examiner—Ian J. Lobo
Attorney, Agent, or Firm—Cox & Smith Incorporated

[57] ABSTRACT

Methods and apparatus are described for estimating shear wave slowness of formations traversed by a borehole from guided wave acoustic log data. Acoustic energy is generated at a point in the borehole and received at at least four receiver stations spaced one from the other and from the generating point. Full wave forms of the received signals are produced and windowed to identify guided wavelets. Fourier transforms of the guided wavelets are obtained and from these determined the phase velocity and frequency of the guided wavelet. Values of formation density, drilling fluid density, drilling fluid slowness and borehole diameter are measured and a value of Poissons ratio may be estimated. A multi-dimensional matrix is established comprised of predetermined ranges of assumed values of frequency, Poissons ratio, drilling fluid slowness, drilling fluid density, formation density, phase velocity and borehole diameter. The measured data is fitted to the multi-dimensional matrix to obtain an estimate of shear wave slowness at the point in the borehole, and the estimate is recorded as a function of depth.

17 Claims, 16 Drawing Figures

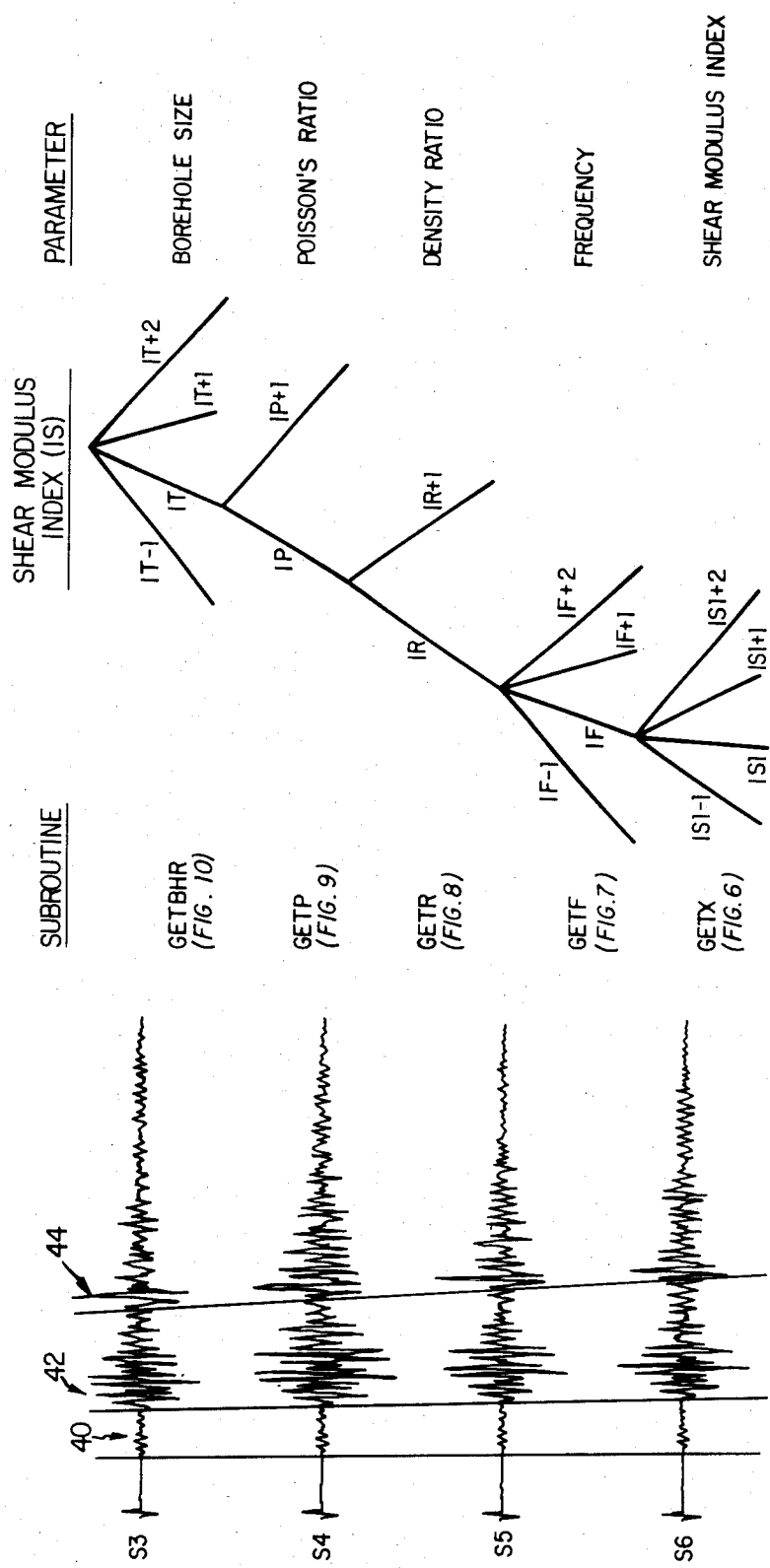

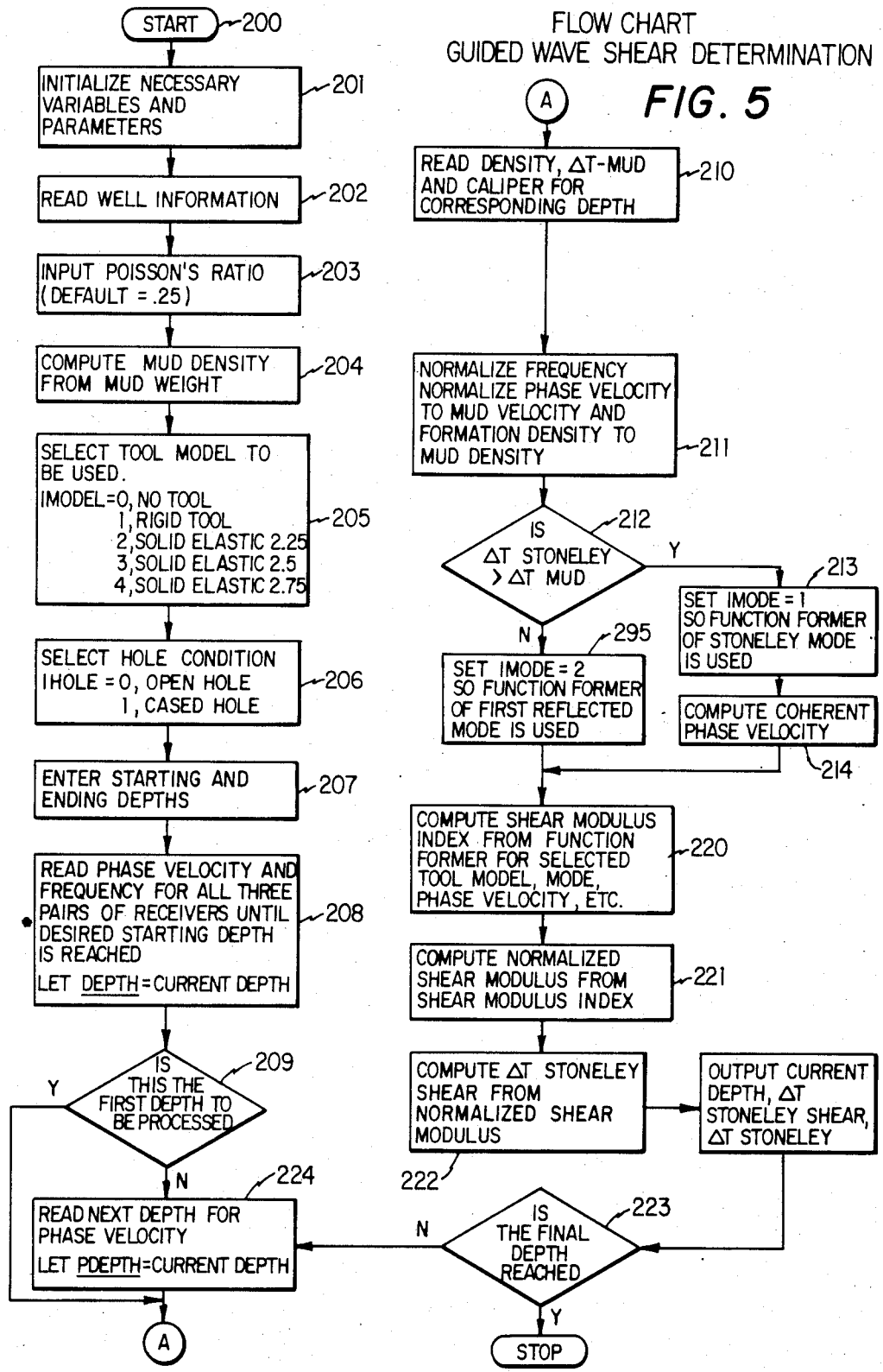

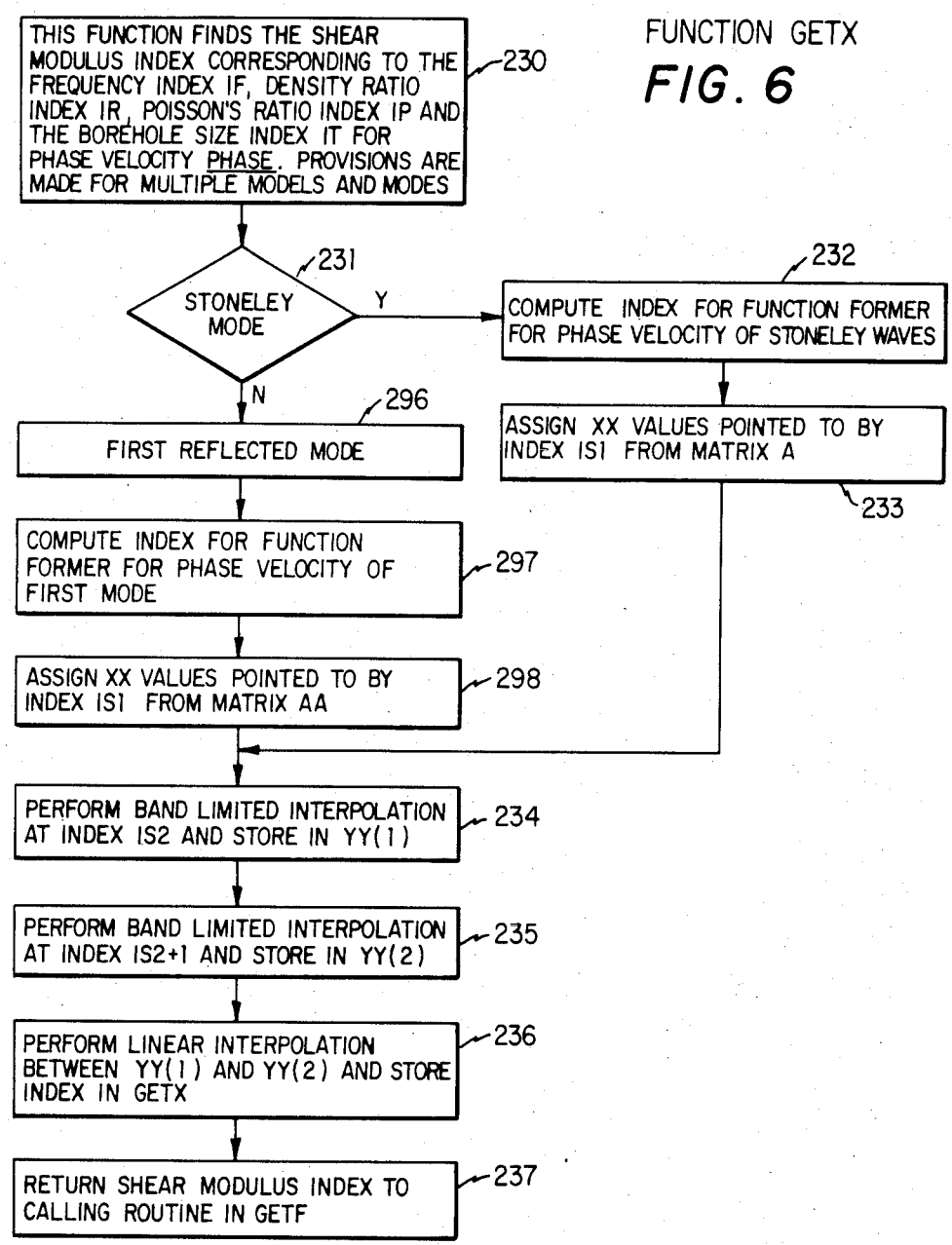

FUNCTION GETF

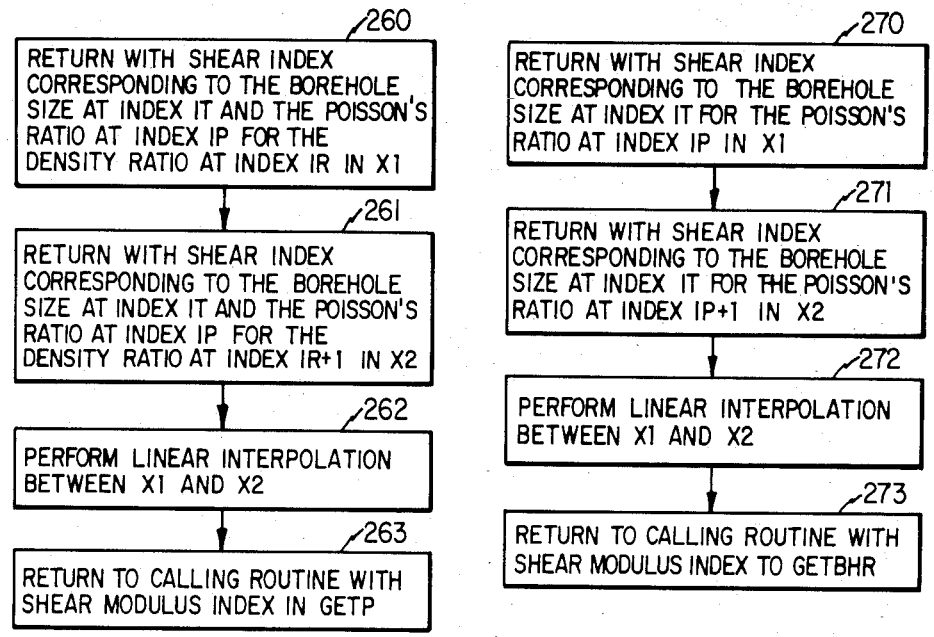
FUNCTION GETR
FIG. 8
FUNCTION GETP
FIG. 9
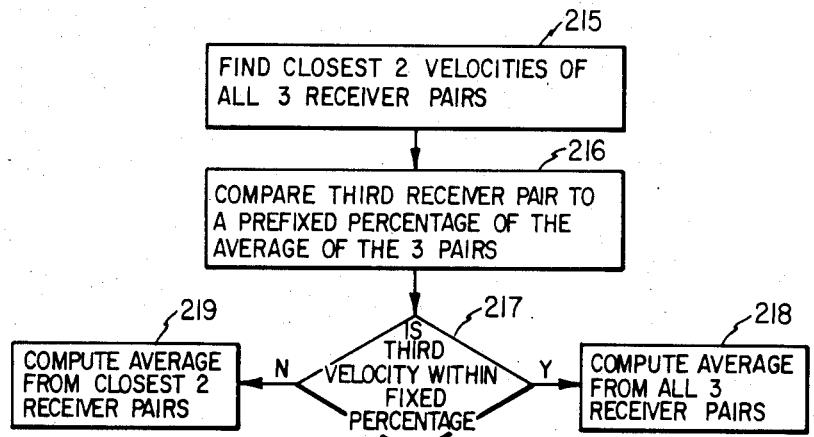
FUNCTION GETVS
FIG. 11

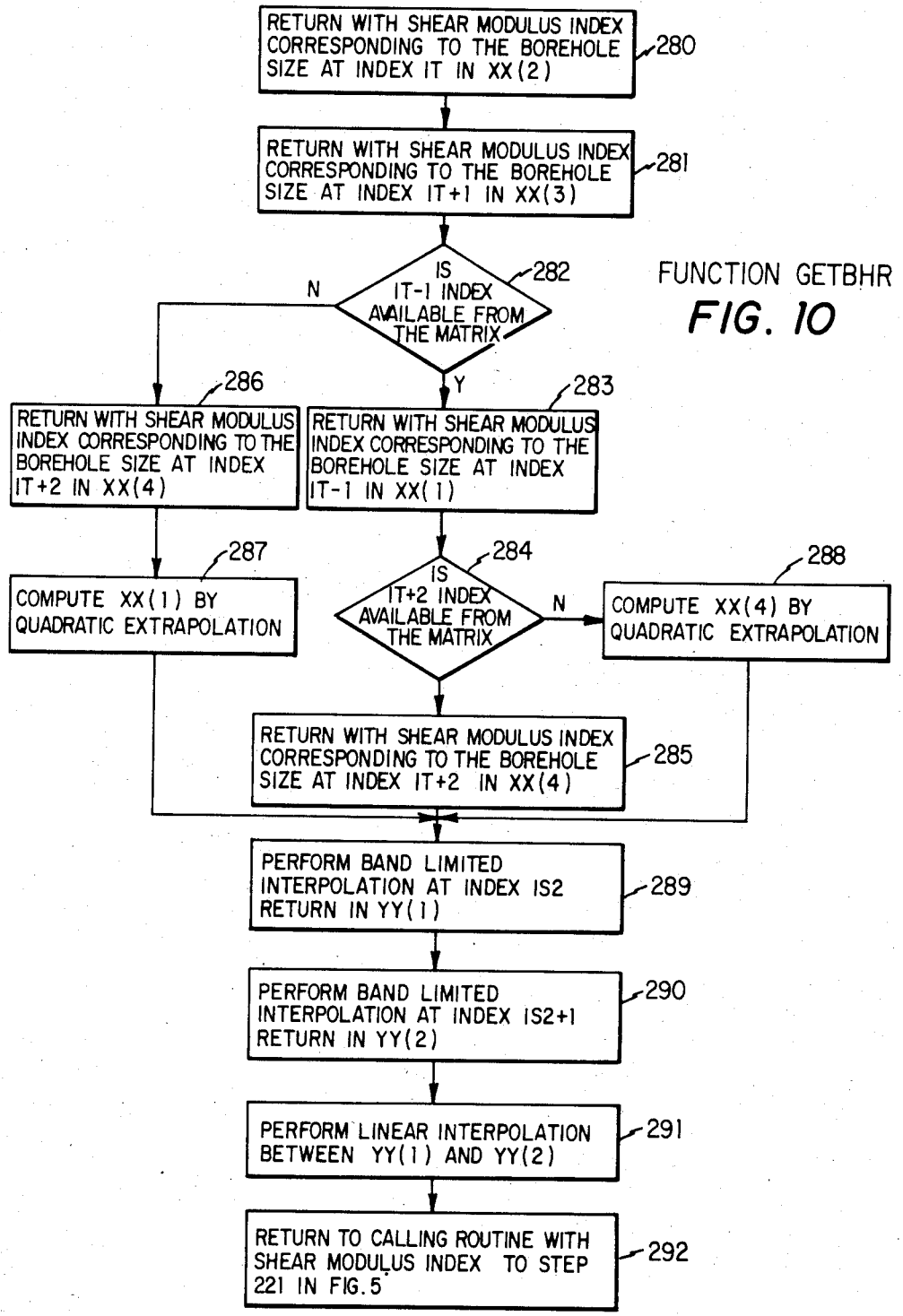

STONELEY PHASE VELOCITY VS. SHEAR MODULUS

FIRST MODE PHASE VELOCITY VS. SHEAR MODULUS

METHOD AND APPARATUS FOR INDIRECT DETERMINATION OF SHEAR VELOCITY FROM GUIDED MODES

FIELD OF INVENTION

This invention relates to methods and apparatus for sonic well logging. More specifically, this invention relates to methods and apparatus for determining parameters of shear waves by investigating acoustic waves propogating as guided waves within a borehole, either open hole or cased.

BACKGROUND OF INVENTION

Acoustic well logging techniques and tools are extensively described in the art. Acoustic well logging is used to provide surveys of formations traversed by earth boreholes. In particular, measurements are made of the velocities of acoustic waves to reveal valuable information concerning the type of rocks and the porosity of the rocks in the formations surrounding the borehole. A commonly measured acoustic parameter is the slowness of compressional waves measured in micro-seconds per foot. However, it is desirable that other acoustic wave parameters such as the slowness of shear waves be determined.

Identifying the compressional wave and measuring its slowness is generally not difficult. It is the fastest propagating wave in the formation, is non-dispersive, and is the first to reach an array of borehole receivers, when a short burst of energy from a nearby transmitter propagates through the formation.

Measuring shear slowness is considerable more difficult. Because it propagates more slowly, the shear wave arrives after the compressional wave. Therefore, its arrival is typically obscured by compressional energy and slowness determination directly from arrival time is at best difficult and at times impossible.

The areas where shear wave slowness data theoretically or emperically can be applied are diverse. Some of the application areas are seismic amplitude calibration and interpretation, sand control, formation fracturing, reservoir material balance and subsidence studies, lithology, porosity and geopressure prediction.

While rich in possible application areas, shear slowness is difficult to measure automatically with conventional acoustical devices and detection procedures. Except in limited lithology-logging conditions, manual examination of wave forms commonly is required to extract shear slowness. Even then, there has been considerable uncertainty in shear arrivals on short-space tools, due to compressional wave interferrence. In softer rocks, conventional tools simply do not transmit distinct shear arrivals.

Current axially arranged transmitter-receiver tools are designed primarily for detection of compressional waves. Down hole amplifiers adjusted to accentuate the first compressional wave arrival normally saturate through the shear and the late compressional regions of the wave form. When down hole gain is reduced to eliminate amplifier saturation, one observes that initial shear arrivals generally are super-imposed on the later portions of the compressional arrivals with contributions from normal modes arrivals also known as reflected modes other than Stoneley. These contributions make the signal analysis for the direct determination of shear and normal modes slowness impractical at the present state of the art. The problem is compounded in that the initial shear energy commonly is on the same order of magnitude as the normal modes wave energy. Additionally the normal modes wave onset, is almost always obscured by shear wave interference. In some lithologies, such as slow shale when the shear velocity is on the same order of magnitude, or less, than the sound velocity in the fluid then a direct shear arrival is no longer observed by the conventional sonic logging tools. In the zero frequency limit the shear modulus may be determined from the phase velocity of the Stoneley wave if the borehole fluid velocity and fluid density are known. In the higher frequency domains the shear modulus can be determined from the phase velocity of either the Stoneley or the normal modes arrivals when additional parameters are available.

Techniques have been developed for determining normal mode arrivals slowness where the normal modes arrivals are at least partially obscured by the presence of the shear wave. One such technique is described in Co-pending Application filed by Co-employees, Thomas W. Parks and Charles F. Morris entitled "Method and Apparatus for Determining Accoustic Wave Parameters from Acoustic Well Logging Wave Forms" as described in application Ser. No. 372,271, now U.S. Pat. No. 4,562,557, filed Apr. 27, 1982, and assigned to the same assignee as the present application.

In the Parks, et al application, a method is described for estimating or determining the slowness of various wave components of signals received from a linear array of sonic well logging receivers. One of the wave components is the first reflected mode component. The method of determining or estimating parameters of these composite acoustic waves arriving sequentially to the plurality of points spaced vertically along the length of a borehole generally comprises the steps of generating acoustic energy in the borehole and receiving that energy at each of the points after refraction, reflection and direct transmission through and along the formation adjacent to the borehole. A window is established, having a predetermined length and moveout. This window is positioned along the composite wave and the energy received is multiplied at each point by the window, which is delayed by an amount proportional to the transmitter-spacing, thereby attenuating interferring waves. A Fourier transform is generated of that portion of the received energy multiplied by the window to produce a plurality of complex signals in the frequencey domain, which are simultaneously analyzed to obtain an estimate of the parameters. A different moveout is then established for the window and for each different moveout position, the Fourier transform is produced and analyzed. The window is then incremented along the composite waves and the above steps of multiplying, transformation and analysis are performed to obtain the best estimate of the parameters.

The foregoing technique operates well where the composite waves indeed include the shear wave. There are, however, formation conditions that severely attenuate the propogation of the shear wave or instances where the shear wave will not be detected. A need therefore, has remained for an accurate, versatile and reliable method and apparatus for estimating shear wave velocities under all logging conditions, including those where the shear wave is highly attenuated or not detectable.

The phenomenon of normal modes propagating in a fluid-filled borehole has received considerable attention in literature. At long distances from the transmitter, most of the energy in the sonic wave form is contained in the modes. This factor alone would justify studies of their properties. In addition, it has been proposed to use estimates of modal amplitude, phase slowness and attenuation to infer, indirectly, formation parameters of interest, including shear slowness and attenuation. One such proposal study is described in U.S. Pat. No. 4,131,875 issued on Dec. 26, 1978 entitled "Method and Apparatus for Acoustic Logging of a Borehole" and assigned to the assignee of the present application by J. D. Ingram. The patent discloses a method and apparatus where under conditions of soft formations, the amplitude of the Stoneley waves are used to determine both the formation shear velocity and attenuation.

The Stoneley mode is routinely observed in field data, but there has yet to be a convincing demonstration in the literature of it being used to make a log. For example, Cheng and Toksoz in their paper entitled "Elastic Wave Propogation in a Fluid-Filled Borehole and Synthetic Acoustic Logs" appearing in Geophysics, Volume 46, No. 7, pages 1042–1053 of July 19, 1981, claimed to identify trapped modes in field data recorded by a commercial tool. Their evidence consists only of visual comparisons between field wave forms and synthetic wave forms. This is an inclusive procedure, first because of the complicated dependence of the modes on the physical parameters of the borehole, and second, because the trapped modes are highly dispersive, so they have no simple time-space dependence.

Methods and apparatus have been proposed for the indirect determination of the shear modulus by measuring the phase velocity of a guided wave of accoustic energy, for example, the Stoneley wave, and utilizing it to estimate the shear modulus and the shear slowness. This technique is described in Co-pending application Ser. No. 434,658, filed Oct. 15, 1982 now U.S. Pat. No. 4,575,830, by Josephine Murray and John Ingram, for "Indirect Shear Wave Determination." This applicaton is assigned to the same assignee as the present application. The method of the Co-pending application utilizes at least four full waveform receiver signals and a "window," which is placed over the Stoneley arrival of each waveform. The Fourier transform of each windowed portion of the waveform is produced and from the Fourier transform, the phase velocity of the Stoneley wave is determined and the shear modulus estimated. From the relative shear modulus, the density of the mud, the density of the formation and an estimated value of compressional velocity of acoustic energy through the borehole mud is determined the shear velocity or slowness of the formation. More particularly, that method involves the detection of acoustic waves arriving sequentially at a plurality of points spaced vertically along the length of the borehole from a transmitter and windowing the acoustic waves with a window of predetermined length and moveout which is positioned along the received waves relative to the estimated arrival of the Stoneley wave. The signal is multiplied by the window and a Fourier transform of the multiplied signal is taken to produce a plurality of complex signals in the frequency domain. The cross-spectral magnitude and phase is determined for each of the adjacent pairs of receiver signals and the phase velocity is computed from the phase at each frequency. The cross-spectral magnitudes are scanned for a peak in the selected frequency range to identify the frequency at which the peak occurs. From the phase velocity versus frequency relationship, a value of guided wave phase velocity is selected at the identified frequency and an estimate is made of the ratio of the Lame constants. The Lame constants, an estimate of formation density and mud density, together with an estimate of the velocity of acoustic energy in the mud, are utilized to estimate the value of shear wave velocity or slowness.

SUMMARY OF THE INVENTION

The present invention provides novel methods and apparatus for estimating with a high degree of accuracy, shear wave slowness from properties of guided waves, such as Stoneley waves or higher mode waves, the later from time to time being referred to as reflected waves. The method comprises of steps of generating acoustic energy in a borehole and receiving that energy as signals at each of a plurality of receivers arranged in a linear array, spaced from the point of generation with the receivers being equally spaced one from the other. A Fourier transformation is conducted with respect to that portion of the received signals representing the guided waves of interest and an analysis of the Fourier transforms giving rise to a accurate measure of the phase velocity and peak frequency of a selected one of the guided waves. Real values are obtained of formation density, drilling fluid slowness, borehole diameter, drilling fluid density and Poisson's ratio. Multi-dimensional matrices are established utilizing a range of assumed values of frequency, Poisson's ratio, formation density, drilling fluid density, drilling fluid slowness. Thereafter, the measured data are fitted to a selected one of the multi-dimensional matrices to obtain an estimate of shear modulus, and from the shear modulus, there is computed a value of shear slowness or shear velocity. The estimated value of shear velocity or shear slowness is plotted as a function of depth.

The various values or points established within the matrices are represented by poles in f-k space and the fitting of the measured data to the matrices is conducted in accordance with a five layer interpolation procedure. In conducting the interpolation procedure, the parameters employed include the phase velocity of the guided wave, such as the Stoneley, an estimate of shear modulus index, frequency, a density ratio as between borehole fluid density and formation density, Poisson's ratio, mud velocity and borehole size.

In accordance with another aspect of the present invention, there can be determined whether the formation under investigation is isotropic or transversely isotropic. This is accomplished in an environment where direct shear measurements are available and there is conducted a determination of shear velocity from the guided waves. If there is very close correspondence between the measured shear and the computed shear, the formation is isotropic. If there is a difference as between the measured shear velocity and the computed shear velocity, there is a high probability that the formation is transversely isotropic. This information is valuable in determining the likelihood of a sub-surface formation to be susceptible to hydraulic fracturing.

BRIEF DESCRIPTION OF DRAWINGS

FIG. 3 illustrates a selected suite of typical wave forms produced at each of a series of spaced receiving transducers in response to the generation of a pulse of sonic energy at a transmitter, and further illustrating the moveout of selected portions of the waveforms;

FIG. 4 illustrates a five layer procedure for the determination of shear modulus index in accordance with the present invention;

FIG. 5 illustrates a flow chart representing a guided wave shear determination program conducted in accordance with the present invention;

FIG. 6 is a flow chart of a sub-routine (function) GETX;

FIG. 8 is a flow chart of a sub-routine (function) GETR;

FIG. 9 is a flow chart of a sub-routine (function) GETP;

FIG. 10 is a flow chart of a sub-routine (function) GETBHR;

FIG. 11 is a flow chart of a sub-routine GETVS for determination of coherent phase velocity;

Figure 1:
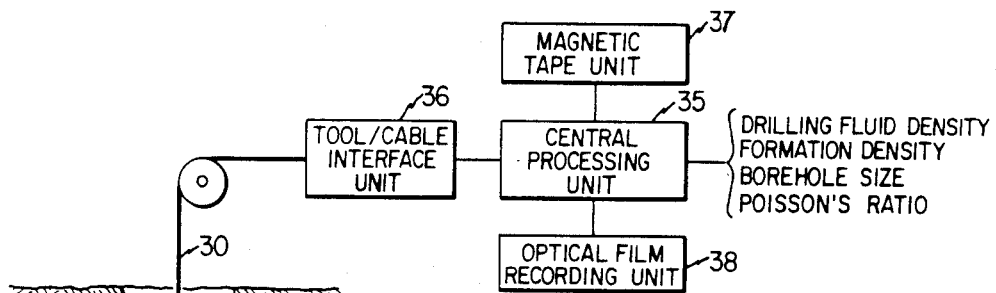
FIG. 1 is a figurative illustration of a system, including a borehole logging system according to the present invention.

The method and apparatus described herein maybe utilized with or incorporate a wide class of acoustic logging tools. A diagram of a suitable tool or sonde 10 is shown in FIG. 1. It includes an acoustic transducer, a transmitter 11, used to generate acoustic energy in the form of sonic pulses in the borehole fluid within the borehole 20 and the surrounding formation 21. Eight additional acoustic transducers R1 through R8, inclusive, are provided and utilized as sonic pulse receivers for reception of acoustic signals propagating through the formation and through the borehole. The transmitter 11 is spaced from 8 to 10 feet from the near receiver R1 and each of the receivers are spaced 6 inches apart. Bow-spring centralizers (not shown) are utilized to keep the sonde 10 centered in the borehole.

Several times each second, on command from the surface control and processing equipment (not shown), a particular transmitter and receiver combination is selected and the transmitter is excited or fired. Commands are sent down the wire line cable 30 supporting the tool 10 in the borehole 20 and are decoded in an electronic cartridge 31 interconnecting the cable 30 and the tool or sonde 10. The received wave form for each firing is amplified in the cartridge 31 and transmitted up the cable 30 to surface equipment.

The mode of transmission may be either analog or digital. If it is digital, the amplified waveform values are sampled at a regular prescribed rate, typically 100,000 to 200,000 times per second, then digitized in the cartridge 31. They are then telemetered up the cable 30 as a sequence of binary numbers. If it is analog, the amplified wave forms are passed directly up the cable 30 and digitized in the surface equipment. The surface equipment typically includes a central processing unit 35, a tool/cable interface unit 36, a magnetic tape recording unit 37, an optical film recording unit 38 and other equipment. The program executing in the central processing unit 35 is responsible for issuing commands to the tool through the tool/cable interface unit 36 for selecting the transmitter 11 and the receivers R1 through R8 inclusive, and for firing the transmitter.

Typically, the transmitter 11, in the arrangement shown, is fired eight times to provide a suite of eight full wave signals. With the first firing of the transmitter 11, the receiver R1 is connected; for the second firing of the transmitter 11, the receiver R2 is connected; for the third firing of the transmitter 11, the receiver R3 is connected, and so on.

The central processing unit 35 also retrieves the wave form data, either from a telemetry modular in the tool/cable interface unit 36 if digitization is done down hole, or from a digitizer modular in the tool/cable interface unit 36, if analog transmission is used. In either case, these waveform data are recorded using the magnetic tape recording unit 37. The program may actually process the waveform data at the well site utilizing the shear wave estimation technique described hereinafter and record the resulting shear velocities or slowness using the optical film recording unit 38. Otherwise, processing is performed by a central processing unit located in a remote center using the tapes of waveform data.

In addition to the sonic transducers utilized to detect the appearance of propagating sonic signals through the formation and through the borehole, there is provided in the tool 10 apparatus 39 for measuring the travel time of sonic energy through the drilling mud as the tool or sonde 10 traverses the borehole 20. The operation of apparatus 39 is under control of the central processing unit 35. More specifically, the apparatus 39 includes a transmitter and receiver spaced one from the other and having interposed therebetween the drilling mud. The time of firing the transmitter and the onset of a sonic signal at the receiver are utilized by the central processing unit in determining the slowness of the drilling mud. The firing of the transmitter in the apparatus 39 is synchronized with the firing of the transmitter 11.

The performance of the invention at the well site or at a remote location is optional. In either case, in order to conduct the method of the present invention, additional parameters are inputted to the central processing unit. These parameters as identified in FIG. 1, include drilling fluid density, formation density, borehole size and Poisson's ratio. The parameters, such as formation density, borehole size and Poisson's ratio may be obtained either immediately preceeding or subsequent to the acquisition of the sonic data by way of the sonde 10. The determination of the drilling fluid density may be acquired preferably during the course of conducting the logging operations with the sonde 10.

When the transmitter 11 is excited, it emits an oscillatory burst of acoustic energy. This burst begins to propagate more or less spherically outward from the transmitter as a compressional (pressure) wave in the borehole fluid 15. As the wave passes into the formation 21, its direction of propagation changes as the refracted ray diagrams of FIG. 2 indicate, and its speed increased to that of sound in the specific rock composition. At the same time, some of the energy is converted into shear waves propagating in the formation 21, but at a velocity lower than compressional. In addition, some of the transmitted energy never enters the formation but propagates directly in the fluid as a fluid wave or mud wave and other propagations are in the form of higher guided modes, such as Stoneley waves or as first and second reflected waves.

Figure 2:
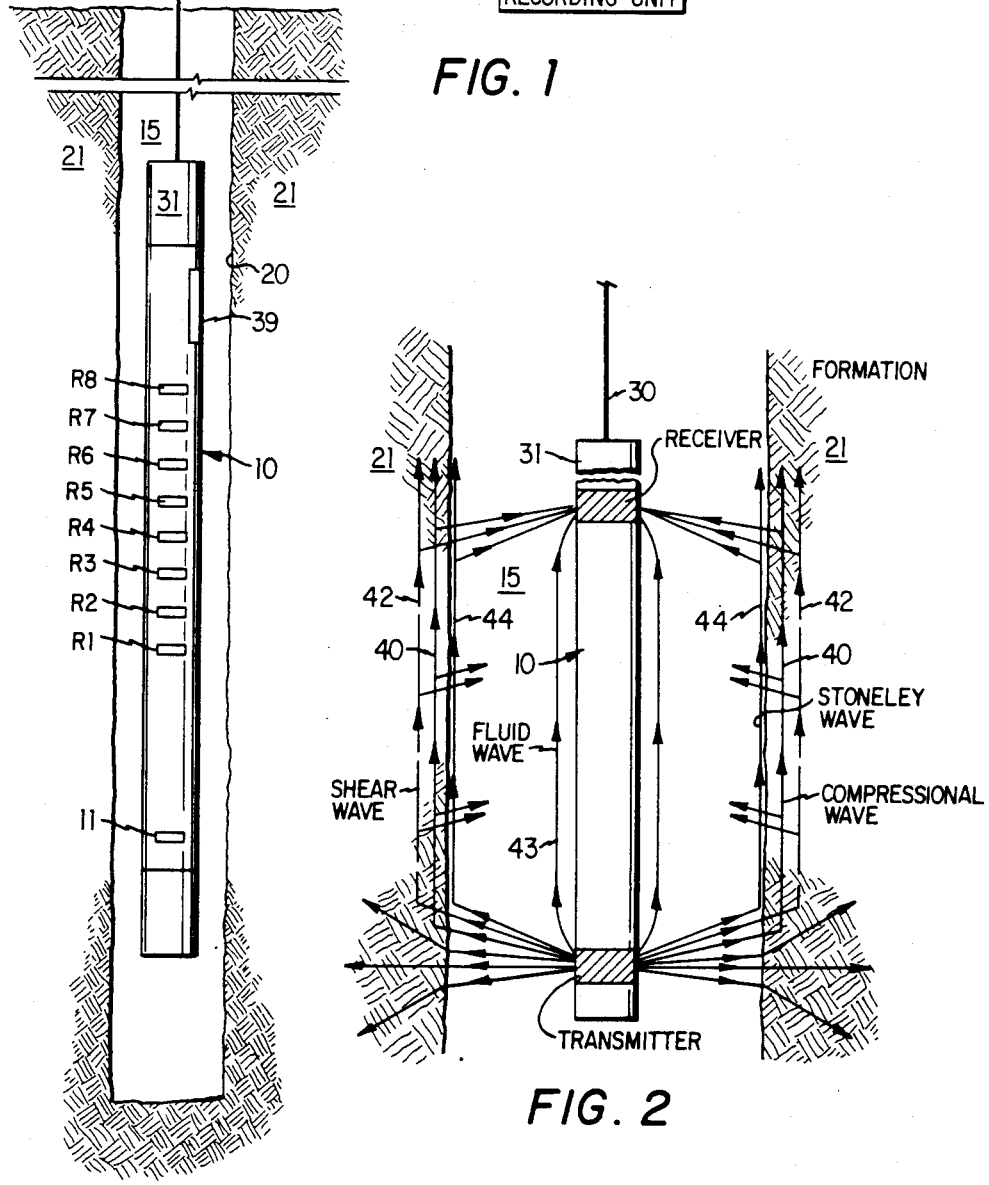
FIG. 2 is a ray diagram depicting propagation of acoustic waves in a borehole and through adjacent earth formations.

There are therefore, several ways for acoustic energy to propagate from transmitter 11 to the receivers R1 through R8, as shown in FIG. 2: through fluid, then formation, then fluid, all as compressional waves 40; through fluid as compressional, then formation as shear waves 42, then fluid as compressional; completely through fluid as waves 43 and finally as guided waves, such as the higher mode waves represented by the Stoneley Wave 44. The first reflected wave and the second reflected wave 46 are not shown. The formation compressional wave 40 travels the fastest and thus is first to arrive at the receivers. The Stoneley wave 44 arrives later and the shear wave 42 arrive somewhere between the compressional waves 40 and the Stoneley wave 44. The first mode or first reflected wave arrives between the shear wave and the Stoneley wave.

Sequential firing of the Transmitter 11 gives rise to a suite of eight full waveforms, one full waveform appearing at each of the receiving transducers R1 through R8. From the suite of eight waveforms, only four need be selected in carrying out the invention, although more maybe employed if desired. The selection process is based upon the criterion of low level of interference. In the case of the Stoneley wave, low levels of interference are represented by a smooth signal peak in the fast Fourier transform of the Stoneley wavelet. Typically, the waveforms appearing at Receivers R3 through R6 inclusive, have exhibited low levels of interference and these waveforms are respectively illustrated in FIG. 3 as waveforms S3, S4, S5 and S6. The waveforms are labeled to show the compressional wave 40, a shear wave 42 and the Stoneley wave 44.

In carrying out the present invention, the waveforms S3–S6 are windowed using windows such as a Hanning Window or a Blackman Window to separate the Stoneley wave 44 from the full wave form.

After the individual waveforms are windowed, the fast Fourier transform of each is taken and the phase differences between adjacent receiver pairs are determined as more fully set forth in the aforesaid co-pending application of Ingram and Murray. The individual phase differences are averaged to produce a phase difference at each frequency value for which the phase velocity is calculated. The phase velocities are computed over a frequency range of interest, and the value of phase velocity associated with the peak of the magnitude spectrum is chosen as the Stoneley wave velocity.

If on the other hand, it is desired to determine the phase velocity of the first reflected mode, the technique disclosed in the above identified co-pending application of Parks and Morris may be employed, in which the Fourier transform data is modeled in the sum of exponentials with unknown spatial frequencies. The spatial frequencies and therefore the slownesses or velocities are determined using an estimation algorithm, such as Prony's method.

Having established the phase velocity and the frequency, steps are now conducted to estimate the velocity or slowness of the shear wave.

Tsang and Rader defined the pressure response in the cylindrical borehole due to a point pressure source P (z,t) on the axis as follows:

$$P(z,t) = \frac{1}{(2\pi)^2} \int_\omega d\omega X(\omega) e^{+i\omega t} \int_{k_z} dk_z A(k_z,\omega) e^{ik_z z}. \quad (1)$$

This is described in their paper "Numerical Evaluation of the Transient Acoustic Waveform Due to a Point Source in a Fluid-Filled Borehole", Geophysics, Vol. 44, No. 10, pp. 1706–1720, October 1979.

$X(\omega)$ is the Fourier transform of the source pulse and $A(k_z,\omega)$ is the two dimensional transfer function accociated with the formation and the logging tool. Angular frequency is denoted by $\omega$, the arrival wavenumber by $k_z$ and z is the transmitter-receiver range.

The modal contributions to the total response in equation (1) correspond to the simple poles in the complex $k_z$ plane of the kernel $A(k_z,\omega)$.

Matrices of the simple poles are established in accordance with the teaching of M. Biot in his paper "Propagation of Elastic Waves in a Cylindrical Bore Containing a Fluid" appearing in the Journal of Applied Physics, Volume 23, #9, September 1952, pages 997–1005. The matrices are formed by utilizing the parameters of frequency, phase velocity, the ratio of formation density to mud density, the slowness of the mud or drilling fluid, borehole size and Poisson's ratio. In each instance functions are formed solving for the shear modulus. This is accomplished by inputting all parameters and holding all but one constant. The one variable parameter is then changed in discrete values over a predetermined range. Having established the matrices the measured values of the above measured parameters are then employed to generate a unique value of shear modulus and thereby establish the value of shear wave velocity.

The procedure of estimating the value of shear wave velocity is carried out in accordance with the steps illustrated in FIGS. 5 thru 11 inclusive. The method performs a five layer nested interpolation summarized in FIG. 4. Should any of the parameter values coincide with values appearing in the matrix no interpolation will be needed for that parameter. Otherwise, a linear or a band limited interpolation will be used.

Referring now to FIG. 5, which sets forth the flow chart for indirect determination of shear velocity from Stoneley Phase Velocity, the program is initiated at start 200. In Step 201, there is initialized the necessary variables and parameters; for example the definition of terms to be utilized in the program. In Step 202, the well information is read in. This information includes transmitter to receiver spacing, receiver spacing and sampling rate of the digital data. In Step 203, there is inputted Poisson's ratio, which can be established from known characteristics of the subsurface formations that is whether they be sandstone or limestone. If this knowledge is not available, then a default value of 0.25 may be inputted representing Poisson's ratio. In Step 204, there is computed the mud density from mud weight. The mud weight is measured at the mud pit. In the alternative, any one of a number of readily available mud density measuring devices may be employed to sample the drilling mud in the mudpit.

In Step 205, there is selected the tool model to be used. There are five (5) choices. For example, if there is no tool in the hole, or a rigid tool in the hole, or a solid elastic tool of 2.25 inches in diameter, or a solid elastic tool of 2.5 inches in diameter, or a solid elastic tool of 2.75 inches in diameter. Thereafter, in Step 206, there is inputted information concerning the hole condition;

that is whether it is an open hole or a cased hole. And now, in Step 207, there is entered the starting and ending depths over which the computation will be performed.

In Step 208, there is entered the Phase Velocity, which may be the Stoneley Phase Velocity, as well as the frequency, at which the Stoneley Phase Velocity was determined utilizing three pairs of receivers R3, R4; R4, R5; and R6, R6 until the desired starting depth is reached thus establishing the value at starting depth of both Stoneley Phase Velocity and frequency. Having determined in Step 209 that this is the first depth to be processed, there is read into the computer by way of Step 210 the density of the formation, the caliper of the borehole, as well as the slowness of the mud at that corresponding depth.

In Step 211, there is conducted a normalization of the frequency, the normalization of the Phase Velocity to mud velocity and the normalization of formation density to mud density. Specifically, the frequency is normalized by dividing the product of the frequency and the borehole radius by the mud velocity. In normalizing the Phase Velocity to the mud velocity, there is taken the ratio of the Phase Velocity to the mud velocity and similarly, the normalization of the formation density is represented as a ratio of the formation density to the mud density.

In Step 212, the Stoneley Delta-T or slowness is compared with the slowness of the mud. If the Delta-T or slowness of the Stoneley is greater than the Delta-T or slowness of the mud, there is confirmed that the wave detected is indeed a Stoneley wave and there is set in Step 213, and I Mode equal to one (1). This establishes the matrix or function former to be utilized in the computation to follow, namely a matrix representative of parameters and values related to the Stoneley mode.

In Step 214, there is determined the Coherent Phase Velocity of the Stoneley mode at that current depth. The determination of Coherent Phase Velocity is accomplished by way of sub-routine GETVS illustrated in FIG. 11. In Step 215, of subroutine GETVS all three receiver pairs are examined and there are selected the two closest velocities of the three velocities previously determined from the receiver pairs. In Step 216, the velocity of the third receiver pair is now compared with the average value of the two selected velocities. If the third velocity is within a fixed percentage value of the average value as examined in Step 217; for example, within the range of ten to fifteen percent, then that velocity is included in Step 218 in the computation of an average from all three receiver pairs. If that third velocity is outside the range, in other words, is in excess of fifteen percent (15%), then it is rejected and in Step 219, the velocity is computed as the average of the velocities of the two receiver pairs.

Having established the mode and identified the matrix or the table of data to be utilized, there is computed in Step 220, the shear modulus utilizing the function former or matrix for the selected tool model and other related parameters. These include the Poisson's ratio, the formation density, the mud density, borehole size, frequency and Phase Velocity.

Figure 12:
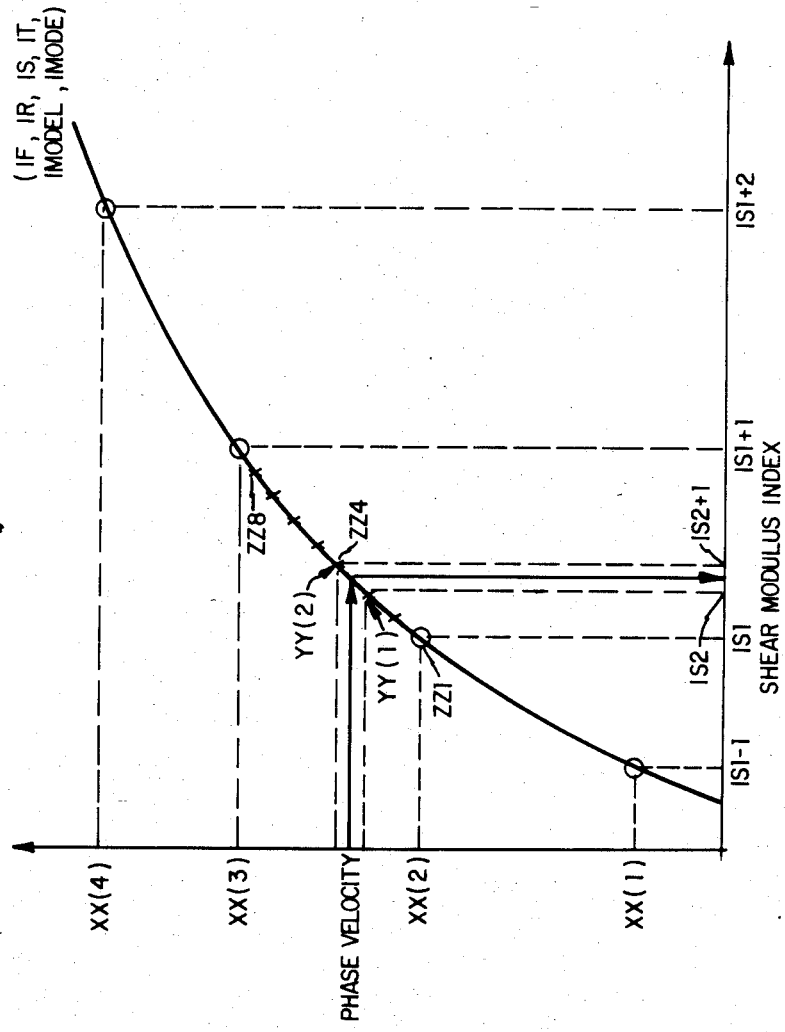
FIG. 12 is a representation of a band limited interpolation technique, helpful in the understanding of sub-routines illustrated in FIGS. 6, 7 and 10.

Referring now to FIG. 12, there is illustrated a function of curve established by four (4) points XX(1), XX(2), XX(3), and XX(4). These points were established by assuming specific values for the various parameters determinative of Phase Velocity, which include frequency, borehole size, density ratio, Poisson's ratio, etc. If the measured value of Phase Velocity occurs opposite one of the points, it is a simple matter to read directly from the curve, a value of shear modulus index. In that case, for example, the value of Phase Velocity would occur precisely, for example, at XX(2), which would project down to the point IS1 on the abscissa representing the value of shear modulus index. However, the probability of this occuring is very low and therefore, it is necessary to examine and utilize families of curves or data points within the matrix in order to establish a value of shear modulus index for the measured value of Phase Velocity. In carrying out the examination or utilization of the multiplicity of points or curves, the series of sub-routines depicted by the flow charts in FIGS. 6 through 10 are employed in the following manner.

In order to understand the process, it will be well to recall the shear modulus index is determined by an inverse process where the Phase Velocity is compared with values stored in the pre-computed table or matrix. As illustrated in FIGS. 12, the Phase Velocity is the ordinate and shear modulus index is the abscissa. The Phase Velocity depends on the seven parameters:

IS = shear modulus
IF = frequency
IR = formation to mud Ratio
IP = Poisson's Ratio
IT = borehole size
IMODEL = tool model
IMODE = Stoneley or first reflected mode Since the number of dependents of Phase Velocity are large, the matrix is computed for a smaller number of each dependent. Hence, after selecting the tool model and the mode in order to get the accurate shear modulus corresponding to a given Phase Velocity, frequency, formation to mud density ratio, Poisson's ratio and borehole size, a five-layer nested interpolation is performed. If any of the parameter values coincide with values that the table or matrix was computed, no interpolation as set forth above will be needed for that parameter. Otherwise a linear or a band limited interpolator will be used; the later being employed where the function is non-linear. Such, for example, as shear modulus, borehole size and frequency.

As the initial step, the table position or matrix position is computed for each parameter, then the lower matrix index is determined. For example, IF, IR, IP, IT represent the lower values in the matrix for frequency, density ratio, Poisson's ratio and borehole size respectively. The five layer interpolation procedure is illustrated in FIG. 6, with the listing of the various sub-routines, as well as their appearance as Figures and the parameters to which those sub-routines relate.

In practice, the sub-routines are called sequentially from FIGS. 10 through 6 with the actual computation beginning with the sub-routine GETX illustrated in FIG. 6.

Referring to FIG. 6, the definition of the function to be performed by the sub-routine is set forth in Block 230, as that of finding the shear modulus index corresponding to the frequency index IF, density ratio index IR, Poisson's ratio index IP and the borehole size index IT for Phase Velocity PHASE. Provisions are made for multiple models and modes. In Step 231, there is confirmed that the mode is either the Stoneley mode or the first reflected mode. If it is the Stoneley mode, then in Step 232, there is computed an index for the function former for Phase Velocity of the Stoneley mode and in Step 233, there are assigned XX values pointed to by index ISI−1, IS1, IS1+1 and IS1+2 from the matrix A. This is shown in FIG. 12, where the value of XX(2) is established for a value of IS1. There is now performed in Step 234, because of the non-linearity of the function, a band limited interpolation at index IS2 in accordance with the technique described in IEEE Transactions on Acoustics, Speech and Signal Processing, volume ASSP-26, No. 4, August 1978, beginning at page 381, authored by T. W. Parks, et al, and entitled "Interpolation Minimizing Maximum Normalized Error For Band-Limited Signals". Having performed the first interpolation, its value is stored at YY(1). In Step 235, there is again performed the band limited interpolation for index IS2+1 and this value is stored at point YY(2). There is now performed in Step 236, a linear interpolation between YY(1) and YY(2) to establish of value for shear modulus index for that "measured Phase Velocity" and a given set of parameters.

Having established a value of shear modulus index for branch (IF, IR, IP, IT), the GETX sub-routine is repeated for another branch value of IT, IP, IR and now substituting IF−1 for IF. Having run through the routine, there is established now a second point or index value for the shear modulus. The sub-routine GETX is repeated again for IF+1 and once more for IF+2, giving rise to four (4) values of shear modulus index corresponding to the four branches for the measured Phase Velocity.

Figure 7:
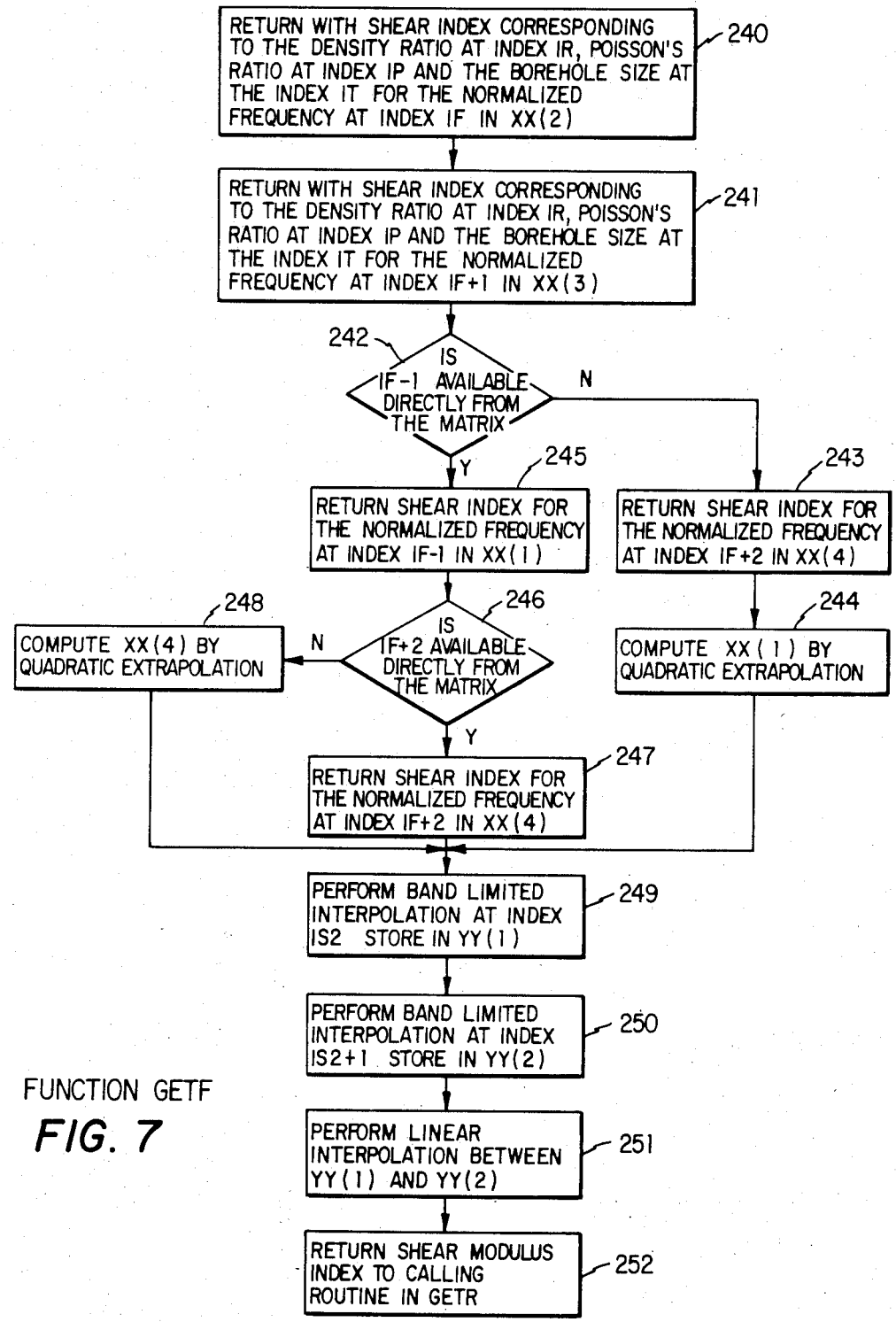
FIG. 7 is a flow chart of a sub-routine (function) GETF.

Having these four (4) values, we now proceed to sub-routine GETF, the flow diagram of which is illustrated in FIG. 7. In Step 240 of function or sub-routine GETF, we input for each of the branches the shear modulus index and frequency corresponding to the measured Phase Velocity, the density ratio at index IR, Poisson's ratio at index IP and the borehole size at the index IT for the normalized frequency at index IF to establish point [IS1, XX(2)], in manner similar to that shown in FIG. 12. The function formed for sub-routine GETF will differ somewhat from that function shown in FIG. 12. However the procedure to be described can be understood by reference to FIG. 12, bearing in mind that the ordinate will now represent frequency. In Step 241, there is established with the shear modulus index for the normalized frequency at index IF+1 the point [IS1+1, XX(3)]. Having established two points for the function of FIG. 12, we now ask in Step 242 whether point XX(1) is available directly from the matrix. That is, whether the frequency IF−1 has previously been selected in computing the matrix. If not, then in Step 243, we return the shear index and the frequency for the normalized frequency at index IF+2 to establish point [IS1+2, XX(4)] since the parameters selected for generating the matrix are such that at least three of the four values are guaranteed to be directly available from the matrix. Continuing on to Step 244, there is computed point XX(1) by utilization of quadratic extrapolation of the points XX(2), XX(3) and XX(4).

On the other hand, if XX(1) is available directly from the table, we proceed to Step 245, where we return the shear modulus index and the frequency for the normalized frequency at the index IF−1 to establish the point [IS1−1, XX(1)]. Continuing to Step 246, we determine whether IF+2 s available directly from the table. If it is, we proceed to Step 247, where we return the shear modulus index and the frequency for the normalized frequency at index IF+2 to establish the point [IS1+2, XX(4)]. If IF+2 is not available, then we compute XX(4) in Step 248 by quadratic extrapolation of the points XX(1), XX(2) and XX(3).

Having established the four (4) points to define a function similar to that illustrated in FIG. 12, there is performed in Step 249, a band limited interpolation at index IS2 in accordance with the previously described method as set forth in the paper by T. W. Parks, et al, and stored as a value at YY(1). Similarly, in Step 250, the band limited interpolation is performed at index IS2+1 and this value is stored at YY(2). There is now performed a linear interpolation between YY(1) and YY(2) to establish a value of shear modulus index for the branch (IR, IP, IT), which is returned in Step 252 in calling routine or function GETR.

Referring once again to FIG. 4, we see immediately that there will be two (2) values of density ratio to be considered in carrying forward the computation. They are the values IR and IR+1. Accordingly, referring now to FIG. 8, in Step 260 of the subroutine or function GETR, we input the shear modulus index corresponding to the measured Phase Velocity and frequency, borehole size index IT and the Poisson's ratio at index IP for the density ratio at index IR to establish a point X1. Similarly, in Step 261, there is inputted the shear index corresponding to the borehole size at index IT and the Poisson's ratio at index IP for the density ratio at index IR+1 to establish a point X2. There is now performed in Step 262 a linear interpolation between the points X1 and X2 and the density ratio determined from the measured parameters is then utilized in conjunction with the linear interpolation to establish a value for the shear modulus index for the branch (IP, IT).

Having established shear modulus indices in accordance with sub-routine GETR, we use sub-routine GETP (FIG. 9) and there input the shear modulus index corresponding to the measured Phase Velocity, frequency and density ratio and the borehole size at index IT for the Poisson's ratio at index IP to establish the point X1. In Step 271, having repeated the sub-routines GETX, GETF and GETR for IP+1, we now return with that determined shear modulus index corresponding to the borehole size at index IT for the Poisson's ratio at index IP+1 to establish point X2. A linear interpolation is performed in Step 272 between the points X1 and X2 to establish a value of shear modulus index for the specific value of borehole size index IT and measured Phase Velocity, frequency and Poisson's ratio.

That value of shear modulus index is inputted by way of Step 280 in function GETBHR as illustrated in FIG. 10. Particularly, the value of shear modulus index corresponding to the measured Phase Velocity, frequency, density ratio and Poisson's ratio for borehole size at index IT establishes point [IS1, XX(2)] as one point of a function relating borehole diameter to shear modulus index.

In Step 281, there is returned or inputted the shear modulus index corresponding to the borehole size at index IT+1 to establish a second point [IS1+1, XX(3)]. This second shear modulus value was established by repeating the computations through the layers as represented by GETX, GETF, GETR and GETP for the borehole size index IT+1. In Step 282, the inquiry is made as to whether or not the borehole size index IT−1 is available from the table; that is, was that value of borehole size utilized in formulating the various points in the matrix. If yes, then that value of shear modulus index would have been, or can be, computed again utilizing the five (5) layer interpolation employing the sub-routines GETX, GETF, GETR and GETP for the borehole size index IT−1 to establish point [IS1−1, XX(1)], as in Step 283.

The inquiries made in Step 284 is as to whether or not the IT+2 index is available from the table or matrix. If it is, then like the determination of shear modulus index for indices IT−1, IT and IT+1, the shear modulus index has been computed corresponding to the borehole size at index IT+2 to establish the fourth point [IS1+2, XX(4)] as in Step 285.

If, on the other hand, in Step 282 it is determined that the IT−1 index was not available from the table, then we proceed to Step 286, where there is returned or inputted the shear modulus index corresponding to the borehole size at index IT+2 to establish point [IS1+2, XX(4)]. If one of the indices is not available from the table, the other three are, and therefore, there will have been performed the computation to establish the shear modulus index for the other three indices of borehole size. Having the three points available, namely XX(2), XX(3) and XX(4), there is in Step 287, computed the point XX(1) by quadratic extrapolation.

If in Step 284, it is determined that the IT+2 index is not available from the table, then utilizing points XX(1), XX(2) and XX(3), there is computed the point XX(4) by quadratic extrapolation in Step 288.

Having previously established the four (4) points defining the function relating borehole size to shear modulus index, there is performed in Step 289 the band limited interpolation at index IS2 to establish the point YY(1). Similarly, there is performed in Step 290, the band limited interpolation at index IS2+1 to establish the point YY(2). A linear interpolation is now performed between YY(1) and YY(2) for the actual value of borehole diameter or borehole size in Step 291, to establish a unique value of shear modulus index for the given set of measured parameters, including borehole size, Poisson's ratio, density ratio, frequency and Phase Velocity.

The unique value of shear modulus index is now inputted in Step 221, FIG. 9, where there is computed the normalized shear modulus from the shear modulus index and from the computed value of normalized shear modulus, there is determined in Step 222 the Delta-T Stonely Shear from that unique value of normalized shear modulus.

The computation is in accordance with the expression $$\beta_2 = \alpha_1 \sqrt{\frac{\mu_2/\lambda_1}{\rho_2/\rho_1}} \quad (2)$$

where:
$1/\beta_2$ is the shear Delta-T,
$\alpha_1$ is the velocity of the drilling mud,
$\mu_2/\lambda_1$ is the shear modulus, and
$\rho_2/\rho_1$ is the density ratio.

In Step 223 for FIG. 9, the inquiry is made as to whether the final depth has been reached; if no, the program is iterated to a new depth and is repeated beginning with Step 224. Each value of computed Delta-T Shear for each selected depth is plotted to produce a Shear Delta-T log.

Figure 13:
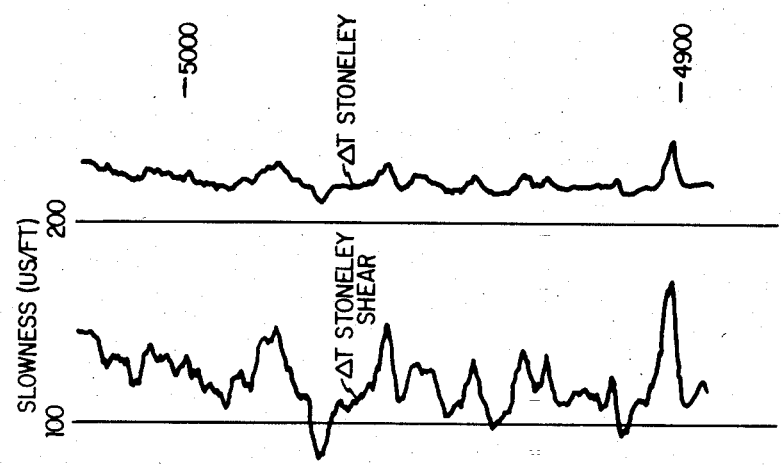
FIG. 13 is a portion of a field log of Stoneley slowness and shear slowness derived from Stoneley phase velocity plotted as a function of depth.

A portion of a field log produced in accordance with the present invention is illustrated in FIG. 13. The model included a rigid tool. The Delta-T Stoneley Shear and the Delta-T Stoneley are shown plotted in terms of microseconds/ft as function of depth.

Figure 14:
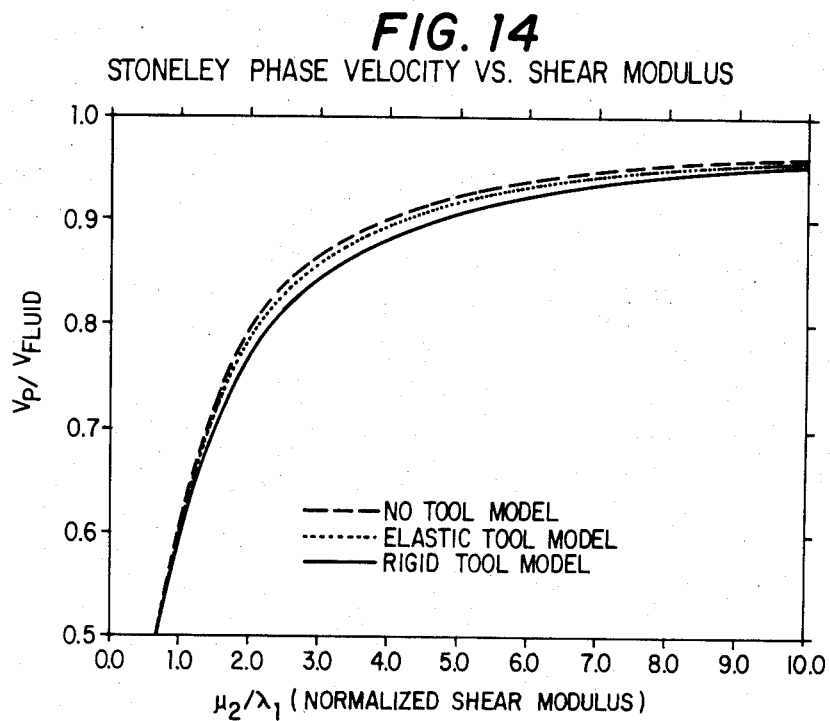
FIG. 14 is a plot of Stoneley phase velocity vs. shear modulus.

Referring to FIG. 14, there is demonstrated the significance of establishing the model of the tool to be employed in the calculation of the normalized shear modulus, which is important in the final determination of Shear Velocity. It will be noted, that particularly in what might be termed hardrock formations, where the normalized shear modulus is greater than 4.00 there is a significant difference as between the model with no tool in the borehole, the model with an elastic tool in the borehole and the model with a rigid tool in the borehole. It is readily apparent that for a measured value of Stoneley Phase Velocity normalized with respect to the fluid in the borehole, that significantly different values of normalized shear modulus will be computed depending upon the tool model employed. It is also readily apparent, that the tool model is not as significant in the softer formations. Fortunately this later condition is the area of interest. In hardrock formations, one is usually able directly to pick the onset of the shear wave and therefore, FIG. 14 demonstrates that where the determination of shear velocity from Stoneley phase velocity is of most interest, the tool model does not significantly affect the indirect determination of shear wave velocities.

Figure 15:
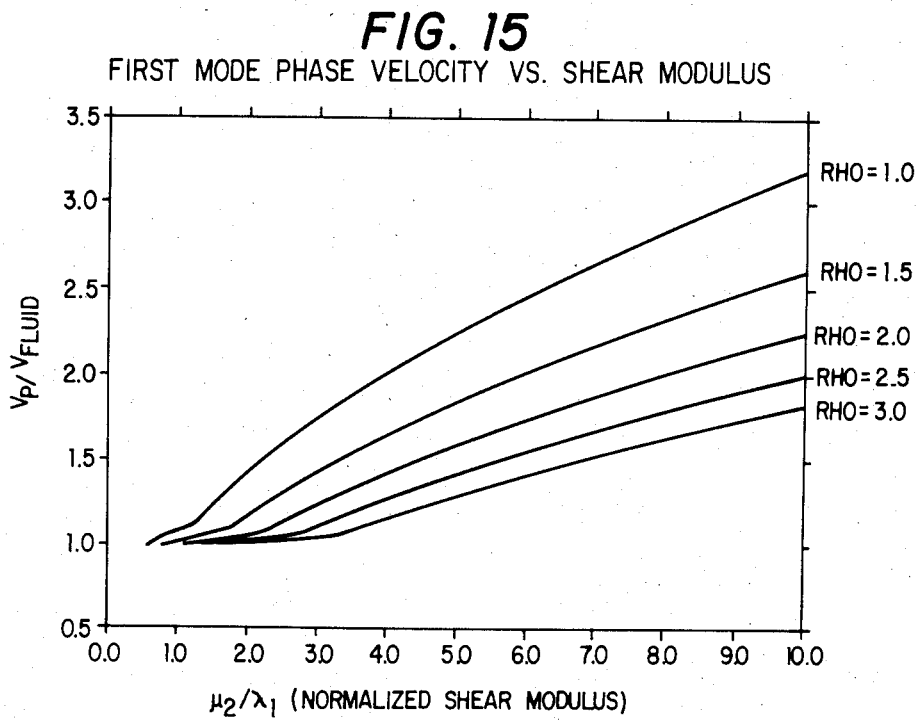
FIG. 15 is a plot of first mode phase velocity vs. shear modulus.

Referring now to FIG. 15, there is illustrated the first mode Phase Velocity vs. Shear Modulus for different values of density ratios ranging in value from 1.0 to 3.0. It is obvious from an inspection of the curves that in soft formations, where the values of shear modulus are 3.5 or less, it is virtually impossible to utilize the first mode Phase Velocity accurately to obtain a measure of shear modulus or an estimate of shear modulus. However, as the formation becomes harder or faster, it now becomes possible, particularly with values of shear modulus in excess of 4, to estimate shear modulus from the first mode Phase Velocity for different values of density ratio. While the first mode Phase Velocity may be utilized to obtain a satisfactory estimate of shear modulus in fast or hard formations, that is not the case with the utilization of Stoneley Phase Velocity. As apparent from examination of FIG. 14, the curves for various tool models begin rapidly to assume an asymptotic relationship beginning at a normalized shear modulus of about 4; and therefore, it is difficult accurately to estimate the shear modulus from the Stoneley Phase Velocity in hardrock formations. In these later instances, as demonstrated by the characteristics illustrated in FIG. 7, it is preferred to use first mode Phase Velocity for estimating shear modulus in hard or fast formations.

Should it be decided because of formation conditions to determine shear velocity from the first mode guided wave rather then the Stoneley wave the procedure outlined by the flow diagram of FIG. 5 is followed to step 218 where the decision is made to utilize the first mode. In that event in step 295 the mode is set equal to two (2) so that the function former or the matrix to be utilized in the estimation of shear velocity will be that associated with the first reflected mode. The other difference occurs in subroutine GETX illustrated in FIG. 6 where having made the decision at step 231 that it is not the Stoneley mode, the first reflected mode is selected in step 296 and there is computed in step 297 the index for the function former or matrix for phase velocity of the first mode. In step 298 there are assigned XX values pointed to by the index IS1 (the shear modulus index) from the matrix associated with the first mode.

From then on the program or procedure is carried out as previously described with respect to the Stoneley mode.

The shear wave velocity determined from the direct shear arrivals is associated with the shear wave that is vertically polarized whereas the shear wave velocity determined indirectly from the Stoneley Wave is associated with the shear wave that is horizontally polarized. If the medium through which the acoustic waves are traveling is isotropic, then both values of Delta-T or Shear Velocity will be identical. However, if the formation or medium is transversely isotropic, then the direct measured value of shear wave velocity will differ from the indirect determined value of shear velocity from the guided modes. More particularly, in a transversely isotropic medium, the value of shear velocity calculated from the Stoneley wave will be faster than the direct shear arrivals. Accordingly, one can immediately determine the nature of the formation as to whether it is isotropic or transversely isotropic by a direct comparison between the direct measured shear wave velocity and the shear wave velocity inferred from the Stoneley wave. One example of a transversely isotropic medium is gypsum soil.

Figure 16:
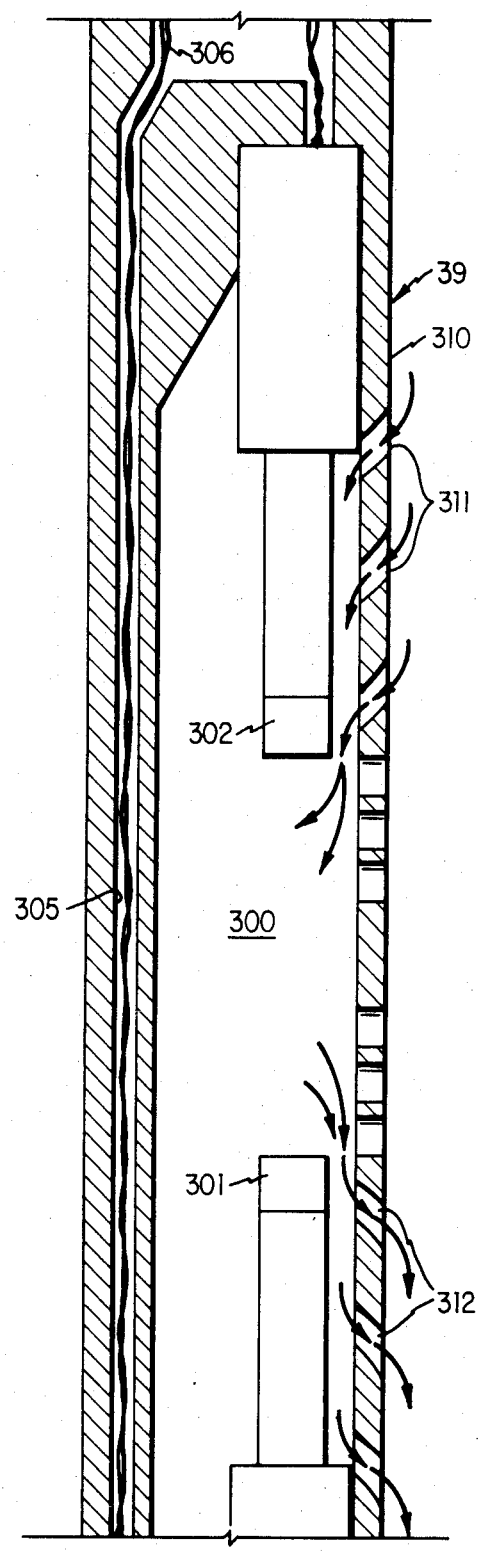
FIG. 16 illustrates apparatus for measuring fluid slowness in situ.

Details of the mud velocity measuring apparatus 39 are illustrated in FIG. 16. A recess is formed in the side of the tool to provide a chamber 300 which contains an acoustic transmitter 301 and an acoustic receiver 302. A conduit 305 is formed through which conductors 306 pass between the lower transducers R1-R8 and transmitter 11 (FIG. 1) and the electronic cartridge 31.

Cover plate 310 is provided with fluid inlet ports 311 and fluid outlet ports 312 through which drilling fluid passes to fill the chamber 300 and provide an acoustic path between the transmitter 301 and the receiver 302. As the tool is moved through the borehole drilling fluid passes into the chamber 300 via ports 311 and passes out of the chamber via ports 312. Thus the space between the transmitter 301 and the receiver 302 is continually filled with new samples of drilling fluid.

Acoustic energy pulses generated by the transmitter 301 and received at the receiver by way of the drilling fluid are utilized together with the known spacing between the transmitter and receiver to produce an accurate measure of drilling fluid slowness which is recorded as a function of depth. In one embodiment the transmitter and receiver were spaced 5 inches apart.

A log of formation density and a caliper log will be run in the same borehole either before or after the acoustic log has been run. The formation density log may be obtained utilizing the system disclosed in U.S. Pat. No. 4,048,495 issued to D. V. Ellis for "Doubly-Compensated Dual-Detector Density Logging Apparatus."

Caliper logging tools are widely used and any one of several well known types may be utilized to obtain a measure of borehole diameter as a function of depth.

The methods of the present invention may be carried out with any suitable general purpose computer which will simulate and provide the means for implementing various ones of the steps. One suitable computer is the VAX 11/780 available from Digital Equipment Corporation.

Now that the invention has been described, variations and modifications will occur to those skilled in the art. It is intended that such modifications and variations be encompassed within the scope of the appended claims.

What is claimed is:

1. A method of estimating shear wave slowness of formations traversed by a borehole from acoustic log data including guided wave comprising the steps of:
   generating acoustic energy at a point in the borehole,
   receiving that acoustic energy as acoustic signals in the form of full waveforms, which include as a portion thereof waveforms representing guided waves, at each of at least four receiver stations spaced one from the other and from the point at which said acoustic energy was generated,
   windowing each of said full waveforms to identify those portions representing a guided wave,
   determining the phase velocity and frequency of the guided wave from that portion of the full waveform representing the guided wave,
   measuring the values for formation density, drilling fluid density, drilling fluid slowness, borehole diameter, and Poisson's ratio,
   establishing a multi-dimensional matrix comprised of given ranges of assumed values of guided wave frequency, Poisson's ratio, drilling fluid slowness, drilling fluid density, formation density, guided wave phase velocity and borehole diameter,
   fitting the measured values to the multi-dimensional matrix to obtain an estimate of shear wave slowness at that point in the borehole, and
   recording the estimate as a function of depth.

2. The method of claim 1 wherein the acoustic energy is received at eight receiver locations and four wave forms are selected exhibiting low orders of interference of the guided wave component.

3. The method of claim 1 wherein the guided wave is the Stoneley wave.

4. The method of claim 1 wherein the guided wave is the first reflected mode.

5. The method of claim 1 wherein the step of measuring drilling fluid slowness is conducted in situ during the course of producing full wave forms of the acoustic signals.

6. The method of claim 1 wherein the establishment of said matrix includes the generation for the assumed values of poles at zero points in f-k space.

7. The method of claim 6 wherein the determination of poles involves the solution of a two-dimensional transfer function $$A(k_2, w)$$

where
   $k_2$ is wave number, and
   $w$ is angular frequency.

8. The method of claim 1 wherein the fitting of values is accomplished by way of a multilevel interpolation, to obtain at each level a solution of shear modulus index with a final unique value of shear modulus index produced at the final level.

9. The method of claim 1 in which the fitting of values generates a unique value of shear modulus and the value of shear wave slowness is computed in accordance with the expression $$\beta_2 = \alpha_1 \sqrt{\frac{\mu_2/\lambda_1}{\rho_2/\rho_1}}$$

where
   $1/\beta_2$ is the shear wave slowness
   $\alpha_1$ is the velocity of the drilling fluid, $\mu_2/\lambda_1$ is the shear modulus,
$\rho_2$ is the formation density, and
$\rho_1$ is the drilling fluid density.

10. The method of claim 8 wherein the first step of the multilevel interpolation utilizes the measured value of guided wave phase velocity and a non-linear function relating phase velocity and shear modulus.

11. The method of claim 10 wherein the second step of the multilevel interpolation utilizes the measured value of frequency and a non-linear function relating frequency and shear modulus for fixed values of borehole size, Poisson's ratio, and the ratio of formation density to drilling fluid density.

12. A method of acoustic logging a formation to determine whether the formation exhibits isotropic or traversely isotropic characteristics comprising the steps of
   measuring the shear wave velocity traversing the formation,
   estimating the shear wave velocity of the formation from Stoneley wave phase slowness, and
   comparing the measured value of shear wave velocity with the estimated value of shear wave velocity to indicate the isotropic nature of the formation.

13. A system for estimating shear wave slowness of formations traversed by a borehole from acoutstic log data including guided waves comprising:
   a sonde having means for generating acoustic energy at a point in the borehole and means for receiving acoustic energy as acoustic signals in the form of full waveforms, which include as a portion thereof waveforms representing guided waves, at each of at least four receiver stations spaced one from the other and from the generating point,
   means for windowing each of said full waveforms to identify those portions representing a guided wave,
   means for determining the phase velocity and frequency of the guided wave from that portion of the full waveform representing the guided wave,
   means for measuring the values for formation density, drilling fluid density, drilling fluid slowness, borehole diameter, and Poisson's ratio,
   means for obtaining a value of Poisson's ratio, means for establishing a multi-dimensional matrix comprised of given ranges of assumed values of guided wave frequency, Poisson's ratio, drilling fluid slowness, drilling fluid density, formation density, guided wave phase velocity and borehole diameter, and
   means for fitting the measured values and the value of Poisson's ratio to the multi-dimensional matrix to obtain an estimate of shear wave slowness at that point in the borehole.

14. The system of claim 13 wherein said means for measuring drilling fluid slowness comprises:
   a cavity in the side of said sonde
   a transmitter of acoustic energy and a receiver of acoustic energy located in said cavity and spaced one from the other,
   means adjacent said cavity for permitting ingress to and egress from said cavity of drilling fluid as the sonde is moved along the borehole whereby drilling fluid fills said cavity between said transmitter and said receiver, and
   means responsive to the time occurrence of acoustic energy at said transmitter and receiver for measuring the travel time of acoustic energy through the drilling fluid.

15. In an acoustic logging system comprising a sonde for logging formations traversed by a borehole filled with drilling mud and having a plurality of acoustic transducers including at least one acoustic transmitter and at least two acoustic receivers spaced from one another and from said transmitter along the length of said sonde, means for measuring the travel time of acoustic energy through the drilling mud comprising:
   a cavity in the side of said sonde,
   a transmitter of acoustic energy and a receiver of acoustic energy located in said cavity and spaced one from the other,
   means adjacent said cavity for permitting ingress to and egress from said cavity of drilling mud as the sonde is moved along the borehole whereby drilling mud fills said cavity between said transmitter and said receiver, and
   means responsive to the time occurrence of acoustic energy at said transmitter and receiver for measuring the travel time of acoustic energy through the drilling mud.

16. Apparatus for determining an isotropic characteristic of underground formations surrounding a borehole filled with fluids comprising:
   a support member,
   first means, mounted on said support member for measuring sonic wave train propagation in underground formations surrounding said borehole,
   second means, mounted on said support member, for measuring sonic wave train propagation in the fluids contained within said borehole,
   means for effecting signal filtering to distinguish components of the sonic wave train measured by said first means, said filtering means having as an input the output of said second measuring means, and
   means for deriving said isotropic characteristic of the formations from said distinguished components.

17. A method for determining isotropic characteristics of underground formations surrounding a borehole filled with fluids comprising the steps of:
   measuring sonic wave train propagation in underground formations surrounding said borehole at a given depth of the borehole,
   simultaneously measuring sonic wave train propagation in the fluids contained within said borehole at said given depth of the borehole,
   filtering the sonic wave train measured in the underground formation surrounding the borehole from the sonic wave train measured in the fluid contained in the borehole, to distinguish components of the sonic wave train and
   using the filtered components to derive said isotropic characteristics of the formations.

* * * * *

UNITED STATES PATENT AND TRADEMARK OFFICE
CERTIFICATE OF CORRECTION

PATENT NO. : 4,633,449
DATED : December 30, 1986
INVENTOR(S) : John D. Ingram and Olive Y. Liu It is certified that error appears in the above-identified patent and that said Letters Patent are hereby corrected as shown below:

In the heading, the Assignee should appear as follows:

Assignee: Schlumberger Technology Corporation

Houston, Texas

Signed and Sealed this

Tenth Day of November, 1987

Attest:

DONALD J. QUIGG

Attesting Officer

Commissioner of Patents and Trademarks